United States Patent
Göransson et al.

(10) Patent No.: US 12,101,149 B2
(45) Date of Patent: Sep. 24, 2024

(54) FREQUENCY DOMAIN SCHEDULING WITH TIME DOMAIN BEAMFORMING

(71) Applicant: Telefonaktiebolaget LM Ericsson (publ), Stockholm (SE)

(72) Inventors: Bo Göransson, Sollentuna (SE); Carl Lutnaes, Uppsala (SE); Magnus Lundevall, Solna (SE); Erik Larsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 245 days.

(21) Appl. No.: 17/765,206

(22) PCT Filed: Sep. 25, 2020

(86) PCT No.: PCT/SE2020/050906
§ 371 (c)(1),
(2) Date: Mar. 30, 2022

(87) PCT Pub. No.: WO2021/066707
PCT Pub. Date: Apr. 8, 2021

(65) Prior Publication Data
US 2023/0029484 A1    Feb. 2, 2023

Related U.S. Application Data

(60) Provisional application No. 62/910,550, filed on Oct. 4, 2019.

(51) Int. Cl.
*H04B 7/06* (2006.01)
*H04W 72/542* (2023.01)

(52) U.S. Cl.
CPC ........ *H04B 7/0617* (2013.01); *H04W 72/542* (2023.01)

(58) Field of Classification Search
CPC .......................... H04B 7/0617; H04W 72/542
USPC .......................................................... 375/267
See application file for complete search history.

(56) References Cited

U.S. PATENT DOCUMENTS

2020/0044840 A1* 2/2020 Chang ................. H04W 12/041

FOREIGN PATENT DOCUMENTS

EP            2632058 A1      8/2013

OTHER PUBLICATIONS

Lutnaes, Carl, "Beamforming in 5G mm-wave radio networks," Master's Thesis, Uppsala University, Mar. 2020, 69 pages.
(Continued)

*Primary Examiner* — Fitwi Y Hailegiorgis
(74) *Attorney, Agent, or Firm* — Sage Patent Group

(57) ABSTRACT

Embodiments described herein relate to methods and apparatuses for providing communication between a base station and at least one wireless device using a first beam. A method in a base station comprises receiving an indication of two or more beams, wherein the two or more beams meet a quality criterion associated with the at least one wireless device; obtaining a combined beam vector, w, based on a weighted sum of two or more beam vectors, $b_k$, associated with the two or more beams; and communicating with the at least one wireless device using the first beam, wherein the first beam is generated using the combined beam vector.

18 Claims, 19 Drawing Sheets

---

302
Receive an indication of two or more beams, wherein the two or more beams meet a quality criterion associated with the at least one wireless device;

304
Obtain a combined beam vector, *w*, based on a weighted sum of two or more beam vectors $b_k$, associated with the two or more beams

306
Communicate with the at least one wireless device using the first beam, wherein the first beam is generated using the combined beam vector

(56) References Cited

OTHER PUBLICATIONS

Lutnaes, Carl, "Radio Network Performance with 5G mm-Wave Beamforming; Comparing Coverage and the Ability to Frequency Multiplex Users," Master's Thesis, Version 0.9.2, Sep. 16, 2019, 69 pages.
Fujio, Shunsuke, et al., "Energy-Efficient Hybrid Beamforming in Millimeter-Wave Communications Using FDMA," International Symposium on Personal, Indoor, and Mobile Radio Communications, Aug. 30, 2015, IEEE, pp. 787-791.
International Search Report and Written Opinion for International Patent Application No. PCT/SE2020/050906, mailed Nov. 27, 2020, 10 pages.

* cited by examiner

FREQUENCY DOMAIN SCHEDULING WITH TIME DOMAIN BEAMFORMING

This application is a 35 U.S.C. § 371 national phase filing of International Application No. PCT/SE2020/050906, filed Sep. 25, 2020, which claims the benefit of provisional patent application Ser. No. 62/910,550, filed Oct. 4, 2019, the disclosures of which are incorporated herein by reference in their entireties.

TECHNICAL FIELD

Embodiments described herein relate to methods and apparatuses for providing communication between a base station and at least one wireless device using a first beam.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Beamforming (BF) or spatial precoding is considered a key feature for Long Term Evolution (LTE) advanced systems and New Radio (NR) 5G systems. For higher frequency bands it may be even more important to include BF functionality to overcome the large pathlosses at these frequencies (for example, above 20 GHz). BF may also help with extending the coverage for lower frequency bands, for example, between 3-6 GHz, and may therefore reduce the number of sites needed for ubiquitous coverage.

There are many ways to implement beamforming functionality but in Orthogonal Frequency Division Multiplexing (OFDM) systems we often distinguish between two main categories. In the first category, transmit beamforming is implemented before OFDM modulation, and is therefore performed on sub-carrier level. This is usually referred to as frequency-domain (FD) precoding since the beamforming is performed prior to the inverse Discrete Fourier Transform (iDFT) that converts the Quadrature Amplitude Modulation (QAM) symbols into a stream of samples usually known as the time-domain signal. As different users are multiplexed in the frequency-domain it is possible to allocate different BF weights to different users, and to do frequency-selective BF. Thus, by multiplying each sub-carrier, or group of sub-carriers (a.k.a. resource block, RB), with a different (complex) precoding weight the users can be allocated different weights within the time-domain signal.

The other main category of beamforming techniques is referred to as time-domain (TD) BF (TD-BF). TD BF is performed after the OFDM modulation, and therefore the data from all sub-carriers (and therefore all users) has already been mixed into the time domain signal before the beamforming is performed. Therefore the whole OFDM symbol is beamformed with the same weight-vector and there is no weighting that can be applied to different users or subcarriers. Hence this is sometimes referred to as wideband precoding/beamforming.

FD beamforming (FD-BF) may in practice be required to be implemented in the digital baseband domain since each sub-carrier or QAM symbol should be multiplied with a complex weight. For TD-BF there are different implementation choices. TD-BF may be implemented in the digital domain after the iDFT operation that converts the QAM modulated sub-carriers to a TD OFDM symbol. It may also be digitally implemented in the radio domain before or after different carriers are combined for up-conversion to radio frequency. Alternatively, TD BF may be implemented by an intermediate frequency (IF) or radio frequency (RF) phase shifter at either IF or RF, which is common for high frequency (e.g. >20 GHz) systems. The latter is usually referred to as analog beamforming (ABF).

Embodiments described herein consider TD-BF. The exact implementation of the BF functionality is not important for the method disclosed here, so any methods for implementing TD-BF may be utilised to implement the disclosed embodiments. The TD-BF may be for example, (digitally) controlled phase shifter and attenuators on analog RF, or complex multiplications on the time domain samples in the digital radio. However, embodiments described herein consider examples in which the beamforming functionality is performed after the OFDM modulation, and therefore the data for different users is already mixed together by the iDFT operation.

There currently exist certain challenge(s).

A problem with TD-BF is that it may be inefficient in a wideband system. In other words, as the same weights are applied to the whole bandwidth, it may be difficult to utilize the frequency resources in a useful way. This may be particularly so when many small packets are common in the system. In this case, the whole bandwidth is transmitted with weights suitable for a specific user, and hence multiplexing of several users is difficult, at least in the case when they are spatially separated. This problem is illustrated in FIG. 1.

FIG. 1 illustrates frequency-domain beamforming (FD-BF) and time-domain beamforming (TD-BF). An additional, but related, problem addressed by embodiments disclosed herein, is when TD (for example, analog RF) beamforming is applied to a multi-band, or multi-channel system. Most systems comprise a plurality of channels allocated to different carrier frequencies within a frequency band. For example, the 28 GHz frequency band may consist of several 100 MHz channels and one operator may be allocated one, two or more of these channels. These channels may be contiguous (i.e. side by side) but also non-contiguous allocations are possible. To achieve an efficient implementation, it is likely that the radio system (including RF beamforming) will cover a number of these frequency channels, say 600 MHz. This means that the same BF weights are applied across the complete bandwidth (600 MHz), hence all channels will be beamformed in the same way, as illustrated in FIG. 2.

FIG. 2 illustrates channelization, a number of 100 MHz channels build up one band.

Yet another problem addressed by embodiments disclosed herein is to generate a beamforming vector for one user (or wireless device) for use in a spatially disperse environment. In such a system, it may not be optimal to generate one beam having a peak pointing in a certain direction, rather it may be preferably to have a beam having a beam pattern with a plurality of peaks corresponding to the different paths in the channel. Embodiments disclosed herein make use of the similarities between the case of scheduling different frequency resources to several users in different directions and scheduling the same resource to one user in many directions.

SUMMARY

According to some embodiments there is provided a method in a wireless device for communicating with a base station using a first beam. The method comprises measuring a quality metric of a plurality of beams; selecting two or more beams for which the quality metric meets a quality criterion; calculating a combined beam vector, w, based on a weighted sum of two or more beam vectors, $b_k$, associated with the two or more beams; and communicating with the base station using the first beam, wherein the first beam is generated using the combined beam vector, w.

According to some embodiments there is provided a method performed by a base station for communicating with at least one wireless device using a first beam. The method comprises receiving an indication of two or more beams, wherein the two or more beams meet a quality criterion associated with the at least one wireless device; obtaining a combined beam vector, w, based on a weighted sum of two or more beam vectors, $b_k$, associated with the two or more beams; and communicating with the at least one wireless device using the first beam, wherein the first beam is generated using the combined beam vector.

According to some embodiments there is provided a wireless device for communicating with a base station using a first beam. The wireless device comprises processing circuitry configured to: measure a quality metric of a plurality of beams; select two or more beams for which the quality metric meets a quality criterion; calculate a combined beam vector, w, based on a weighted sum of two or more beam vectors, $b_k$, associated with the two or more beams; and communicate with the base station using the first beam, wherein the first beam is generated using the combined beam vector, w.

According to some embodiments there is provided a base station for communicating with at least one wireless device using a first beam. The base station comprises processing circuitry configured to: receive an indication of two or more beams, wherein the two or more beams meet a quality criterion associated with the at least one wireless device; obtain a combined beam vector, w, based on a weighted sum of two or more beam vectors, $b_k$, associated with the two or more beams; and communicate with the at least one wireless device using the first beam, wherein the first beam is generated using the combined beam vector.

DESCRIPTION

Figure 1:
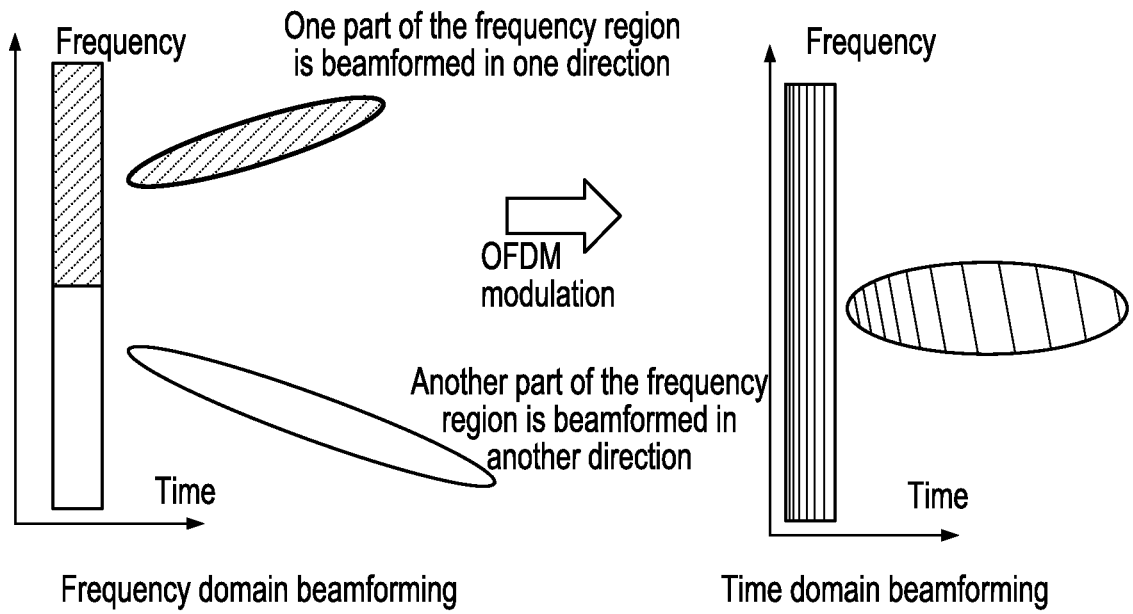
FIG. 1 illustrates frequency-domain beamforming (FD-BF) and time-domain beamforming (TD-BF)
Figure 2:
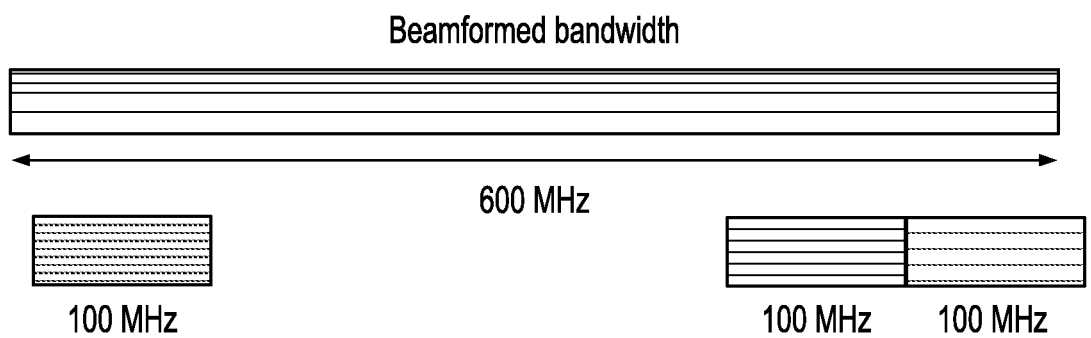
FIG. 2 illustrates channelization, a number of 100 MHz channels build up one band.

Certain aspects of the present disclosure and their embodiments may provide solutions to these or other challenges.

To be able to schedule several frequency-domain multiplexed wireless devices embodiments described herein obtain a combined beam vector (wherein a beam vector comprises set of weights or phase/amplitude shifts). The combined beam vector may be based on a linear combination of weights appropriate for each wireless device which is part of the multi-user scheduling in one time interval. The combined beam vector may be used for both transmission and reception purposes. The following description focuses on the transmission part (downlink), but the embodiments described are equally well applicable to reception (uplink).

For example, in a codebook-based system each user may report a specific "best" precoder (or beam) and an associated link quality metric. A combined beam vector w may then be calculated as a quality weighted sum of the reported "best" precoders (or beams).

$$w = \Sigma q_k b_k \quad (1)$$

where $q_k$ is a weighting factor and $b_k$ represents the best beam vector for the kth user.

Note that the resulting beamforming weights of the combined beam vector are applied to the time domain signal (e.g. at RF), and therefore all data symbols are transmitted to all wireless devices. However, since the wireless devices are allocated to different parts of the frequency domain in an orthogonal fashion, there will not be any interference between the devices when sending all the data symbols to all wireless devices.

In some examples, the combined beam vector may be mapped onto an enhanced combined beam vector. For example, the weighted linear combination of codebook vectors may not have unitary amplitude over the array even if the original codebook consisted of unitary vectors. If power is important, the combined beam vector could be mapped to the closest unitary vector. Another example would be in an implementation with digitally steered phase shifters. Since these have finite resolution, for example, 60 different positions over 360°, the resolution would be 6° per step, and therefore the enhanced beam vector may be quantized to these values. A similar procedure may be performed for the amplitude if step-wise amplitude/power quantization is used.

In examples in which the objective is to form a multi peak pattern to one wireless device (i.e. different paths for the same channel), the entities (k) in the above equation will not represent different wireless devices, but rather different paths to the same wireless device.

The two cases discussed above, e.g. multi-peak beam to serve several wireless devices or to address the multi-path channel, may be combined.

There are, proposed herein, various embodiments which address one or more of the issues disclosed herein.

Certain embodiments may provide one or more of the following technical advantage(s).

An advantage of the embodiments described herein is that the large bandwidth can be shared between different wireless devices even if the beamforming/precoding operation takes place after OFDM modulation, i.e. in what is referred to as the time-domain. That is, frequency multiplexing of wireless devices while retaining most of the beamforming gain for each wireless device may be facilitated also with time-domain beamforming. This is very beneficial from a network capacity point of view when there are many small data packets or frequent control signalling, especially at high load. It might be particularly important for the uplink.

A more efficient network brings many other benefits, such as a potential for energy savings.

An additional advantage may be seen in systems where one beamforming unit (set of phase shifters) may be used on many channels and still be able to generate a signal with high gain in several directions. Also, if the proposed embodiments are used for a wireless device with large angular spread in its channel, a higher received power can be expected at the wireless device since more paths in the channel are used in the transmission. This also brings valuable diversity in case one of the propagation paths suddenly is blocked or is fading down.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Here the proposed method is disclosed by means of a few examples which can be seen as plausible deployment scenarios. A notation and naming convention is used herein that may be close to what is used in LTE or NR, but the exact names of e.g. different reference signals and reported quality metrics may be different in the standard specification.

Embodiments described herein refer to codebooks, e.g. a fixed and finite set of beamforming/precoding vectors, but embodiments may be applied to any system where the wireless devices report a channel quality parameter measured on beamformed resources. For example, a certain number of Channel State Information—Reference Signal (CSI-RS) resources may be used in a system for the wireless devices to measure on. These CSI-RS may have been weighted by their own spatial (beamforming) weights prior to transmission, therefore these weights are known in the network node and may be used when calculating the combined beam vector based on weighted linear combinations. Each user is typically reporting the "best" CSI-RS and an associated quality index such as Reference Signal Received Power (RSRP), Channel Quality Information (CQI), Signal to Interference plus Noise Ratio (SINR), etc.

Figure 3:
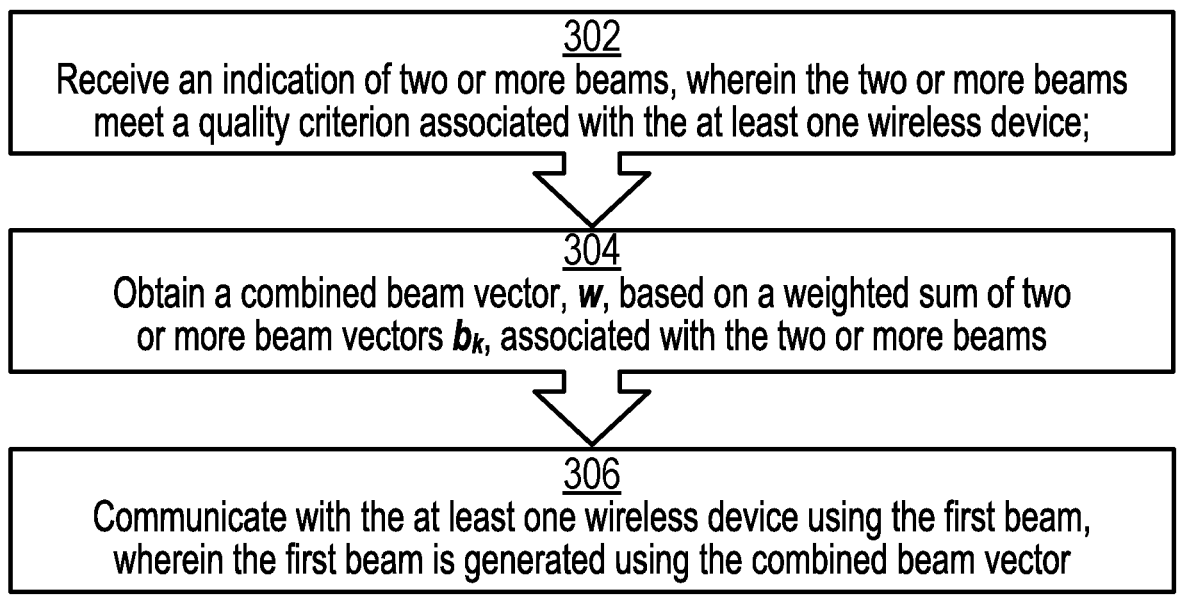
FIG. 3 illustrates a method in accordance with some embodiments.

FIG. 3 illustrates a method in accordance with some embodiments.

FIG. 3 depicts a method in accordance with particular embodiments. The method may be performed by a base station in a network where the based station is configured to communicate with at least one wireless device. The method begins at step 302 with receiving an indication of two or more beams, wherein the two or more beams meet a quality criterion associated with the at least one wireless device. In step 304 the method comprises obtaining a combined beam vector, w, based on a weighted sum of two or more beam vectors, $b_k$, associated with the two or more beams. In step 306 the method comprises communicating with the at least one wireless device using the first beam, wherein the first beam is generated using the combined beam vector.

For example, step 302 may comprise the base station receiving reports from active wireless devices, k, of their preferred beam $b_k$ and an associated link quality metric $p_k$. For example, the indication may comprise a plurality of link quality metrics each associated with the one of the two or more beams. In some embodiments, the wireless devices may report on more than one beam (or even all beams) and the network (for example the base station or another network node) may determine the two or more beams to be used in determining the combined beam vector based on the associated link quality metrics. In some examples therefore, for the method of FIG. 3 the at least one wireless device comprises at least two wireless devices, and the quality criterion comprises a criterion that each beam of the two or more beams comprises a highest quality beam (or one of N highest quality beams where N is an integer) measured by each of the at least two wireless devices. Alternatively a threshold value of quality may be used to determine whether a beam is to be reported, or to determine whether a beam is included in the calculation of the combined beam vector. For example, the quality criterion may comprise a criterion that a quality of the two or more beams measured by one of the at least one wireless device is higher than a quality threshold. In some examples, therefore at least one wireless device comprises at least two wireless devices and step 306 comprises frequency multiplexing information to be transmitted to the at least two wireless devices and transmitting the frequency multiplexed information using the first beam.

In some examples, the two or more beams utilized to calculate the combined beam vector may be measured by a single wireless device, for example where the combined beam vector is being used to provide multiple paths to the same wireless device. The quality criterion may then comprise a criterion that the two or more beams comprise the N highest quality beams measured by a first wireless device. In some examples, the wireless device may be configured to calculated the combined beam vector w. For example as described with reference to FIGS. 19 and 20.

In some examples these two embodiments may be combined (e.g. multi-user and multi-path to a single user), in other words more than one beam reported by each wireless device may be included in the calculation of the combine beam vector.

Based on these reports from the active wireless devices, and other relevant information including but not limited to quality of service constraints and available power and bandwidth, the scheduler (which may form part of the base station or may be in a different node within the network) decides upon the at least one wireless device to schedule within a time interval.

In some examples, each wireless device reports the preferred index associated with a beamformed reference signal and the corresponding link quality. For example, step 302 may comprise receiving the plurality of link quality metrics, $p_k$, and receiving a plurality of indexes k associated with each of the plurality of link quality metrics, $p_k$, wherein each index k is associated with the one of the two or more beams.

The combined beam vector w may then be determined (in some examples by the base station but in some examples in another node in the network) based on a weighted linear combination of the beamforming weights associated with each of the indexes (e.g. codebook entry for each user) to be used in calculating the combined beam vector (e.g. all reported indexes reported by wireless devices scheduled in the same time interval, or a subset of the indexes reported by the wireless devices scheduled in the same time interval wherein the subset is determined based on a quality criteria). In other words, step 304 of FIG. 3 may comprise determining the combined beam vector w, based on a linear sum, $\Sigma q_k b_k$, of the two or more beam vectors, $b_k$, weighted by a plurality of weights, $q_k$.

In other words, the combined beam vector may be calculated as:

$$w = \Sigma q_k b_k \quad (2)$$

where $q_k$ are the weights associated with each index k and $b_k$ represents the beam vector for the $k^{th}$ wireless device (for the example in which the best beam for each wireless device is included in the combined beam vector). Note that the set $\{q_k\}$ or the resulting vector w may need to be normalized to satisfy a maximum power amplifier (PA) power constraint.

Figure 4:
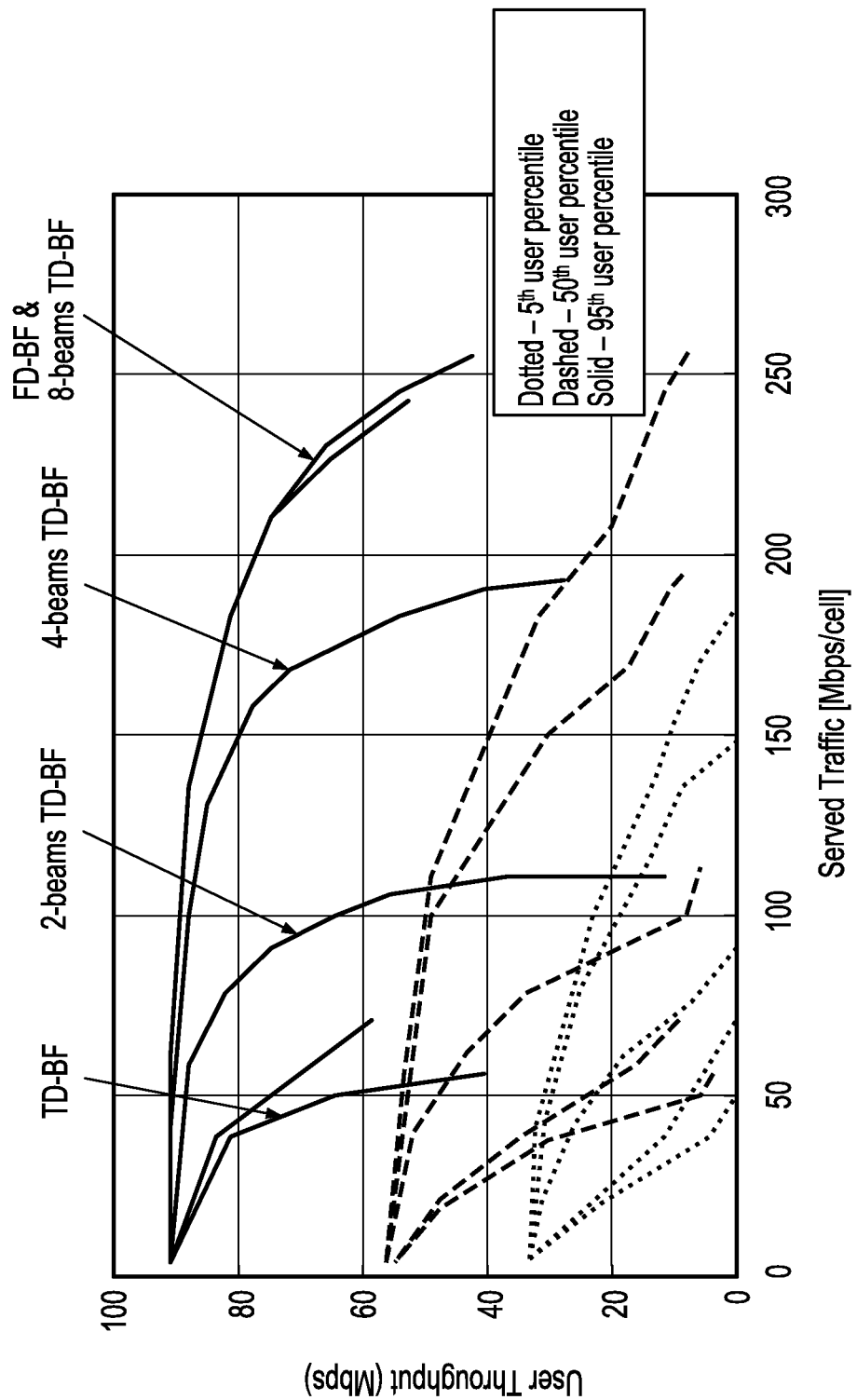
FIG. 4 illustrates user throughput as a function of the served traffic (load) for different beamforming schemes in a scenario with good coverage and rather small data packet sizes.

FIG. 4 illustrates user throughput as a function of the served traffic (load) for different beamforming schemes in a scenario with good coverage and rather small data packet sizes.

In FIG. 4, TD-BF is default 'single' beam time-domain beamforming with very small possibilities to frequency multiplex wireless devices, and FD-BF is frequency-domain beamforming where frequency multiplexing of users is allowed. n-beams TD-BF corresponds to the algorithm as described with reference to FIG. 3 with up to n beams (for example n frequency multiplexed users, or n paths to one or more wireless devices). In this example, the combined beam vector w is constructed using the equation (2) using $\{b_1 \ldots b_n\}$ with $q_k = 1/n$.

As can be seen from FIG. 4, in this example there are substantial capacity gains, i.e. increased served traffic, by utilising the method as described with reference to FIG. 3 compared to conventional TD-BF. Hence, the reduced beamforming gain from the multi-peak approach may be overshadowed by the possibility to frequency multiplex users.

Figure 5:
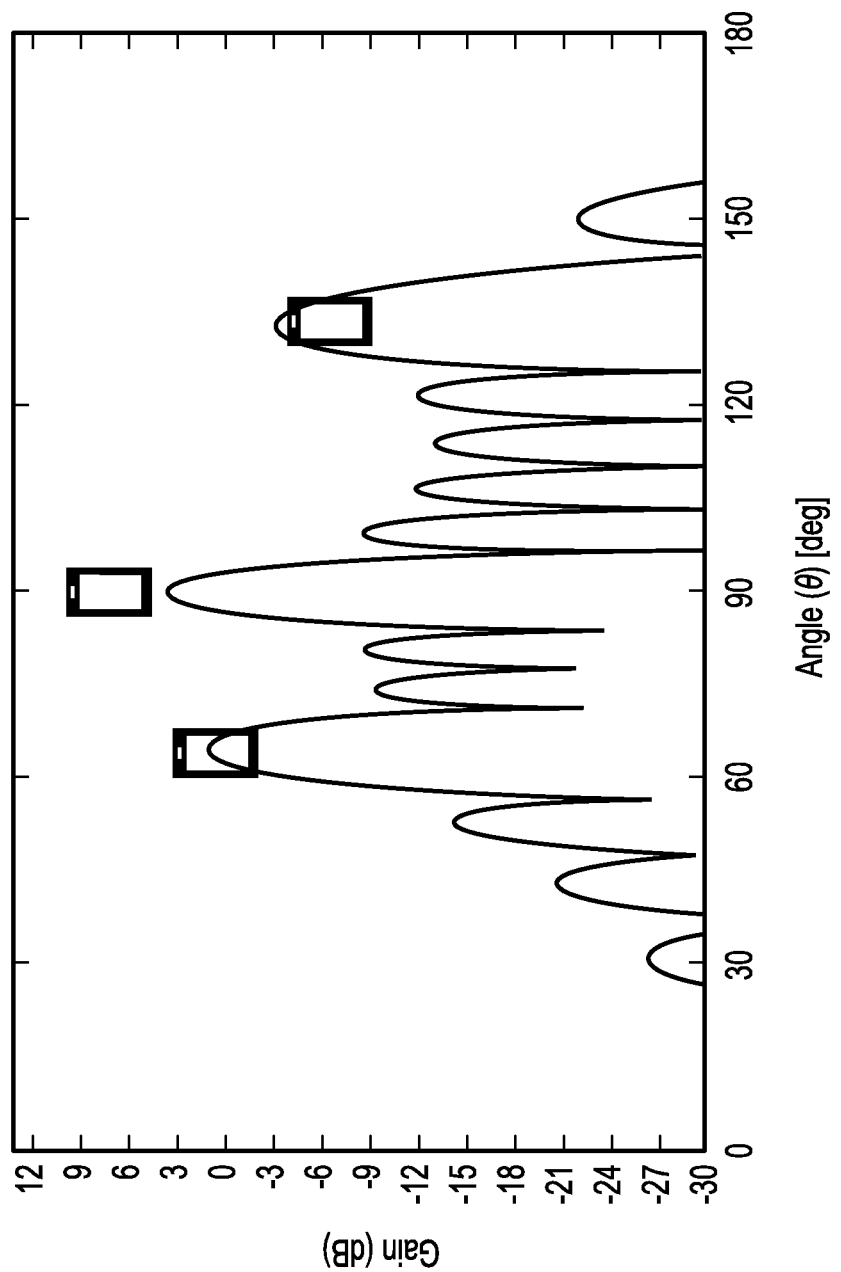
FIG. 5 illustrates a first beam communicating with three wireless devices.

FIG. 5 illustrates a first beam communicating with three wireless devices.

FIG. 5 illustrates the combined beam vector approach of FIG. 3 where three different wireless devices are frequency multiplexed and communication with the three users is performed using a combined beam vector calculated from 3 best beams reported by the wireless devices. The resulting antenna (intensity) pattern shows three clear peaks in the resulting beam at angles corresponding to the scheduled wireless devices positions. More specifically, the precoding vector w is constructed by using equation (2) using $\{b_1 \ b_2 \ b_3\}$ with $q_k = 1/3$.

One objective of some embodiments may be to facilitate ease of implementation. There may be practical constraints involved in the process of forming the combined beam vector w. For example, it may be common, at least for systems with many elements in the beam vectors $b_k$, that all possible beam vectors $b_k$ are pre-computed and stored in memory. For example, the two or more beams comprise beams generated based on predetermined beam vectors (e.g. codebooks). In this example, only an index k for each beam may be conveyed over the capacity limited interface. In some examples, if it is too cumbersome to convey both the weights, $q_k$ and the precoding indexes of each of the two or more beam vectors over the interface, one solution is to use fixed values for $q_k$, for example $q_k = 1$ or $q_k = 1/n$ where n is the total number of beams combined. Furthermore, if there are constraints on what operations and the amount of operations that can be used in the process of constructing w this also needs to be taken into consideration. In some examples therefore the method of FIG. 3 further comprises receiving a plurality of indexes, k, associated with each of the two or more beam vectors; and receiving the plurality of weights, $q_k$, associated with each index, k.

In some examples, an objective may be to protect important information more than other information. For example, if one of the precoding beams $b_k$ is associated with important information (e.g. delay sensitive information), then a higher weight may be assigned to this beam. For example, each of the plurality of weights, $q_k$, may be determined based on a priority associated with information communicated using a beam generated using the associated beam vector, $b_k$.

In some examples, an objective may be to ensure that a desired minimum required quality is achieved. The quality of some information, for example some control information, may just need to be just good enough (e.g. just satisfying a level of quality of service (QoS)). There may be little gain to the network to overshoot the level of QoS. For example, each of the plurality of weights, $q_k$, may be determined based on a minimum quality of service associated with information communicated using a beam generated using the associated beam vector, $b_k$.

In some examples, an objective may be to put emphasis on strong links (e.g. where $p_k$ is large) or to put emphasis on weak links (e.g. where $p_k$ is small) in the combined beam vector. Emphasising strong links may be achieved by setting $q_k$ approximately equal to $p_k$ (or making $p_k$ proportional to $q_k$), while focus on weak links may be achieved by setting $q_k$ approximately equal to $1/p_k$ (or proportional to $1/p_k$). In some examples, the worst wireless devices (with weak links) stay a long time in the network and consume a lot of resources, therefore from a network capacity point of view it may be beneficial to drop those wireless devices from the network quickly. However, some fairness is also needed. In some examples therefore, each of the plurality of weights, $q_k$ is determined based on the respective link quality metric, $p_k$, associated with the one of the two or more beams to which the weight is to be applied.

In some examples, each wireless device is measuring (and reporting) on several beams (for example on several CSI-RS transmitted on different beams), e.g. each wireless device is reporting the n best "beams" with their associated link quality metrics to the network. Beams with good enough quality (e.g. beams with quality $$p_i > \alpha \max_{all\ k} p_k$$

for some threshold a may then be combined according to Equation (2) with for example, $q_k=p_k$. This example may ensure that power in the resulting beam is spread in directions where the channel has strong paths.

In yet another embodiment, the preferred beam vectors (i.e. the two or more beam vectors/directions) for the wireless devices may be directly obtained from uplink measurements without the need for Synchronization Signal Block (SSB) and/or CSI-RS probing. For example, a receiver may be used that has full channel observability (e.g. can observe the channel in all directions). Note that it may not be required for the receiver to have full channel observability over the complete (channel) bandwidth. For example it may be possible to measure the 'optimal' beam in just a part of the available bandwidth and then apply this beam for all frequency resources belonging to one wireless device.

As previously described the examples of a multi-peak combined beam to serve several wireless devices or to address a multi-path channel may be combined based on single or multiple reference signal (e.g. CSI-RS) reports.

It is noted that the combined beam vector as described with reference to FIG. 3, in general, may not have unit amplitude distribution over the array. This may also be the case when no power-weighting between the two or more beam vectors is performed, e.g. the weight applied to each beam vector is equal, (for example $q_k=1$ or $q_k=1/n$ where n is the total number of beams combined). This may be seen if for example a DFT codebook is used, where adding two DFT vectors in general does not result in a constant power allocation over the array even if each DFT vector itself has a unit power distribution. Therefore, if more transmitted power is deemed more important than an "optimal" spatial power distribution, a power optimal combined beam vector may be calculated. Since equal (maximum) power per element will generate the largest output power, the weighted sum used to calculate the combined beam vector may be constrained with a per element power constraint, for example:

$w=\Sigma q_k b_k$ such that $|w_m|=1$. (each element of $w$ should have unit length).

Figure 6:
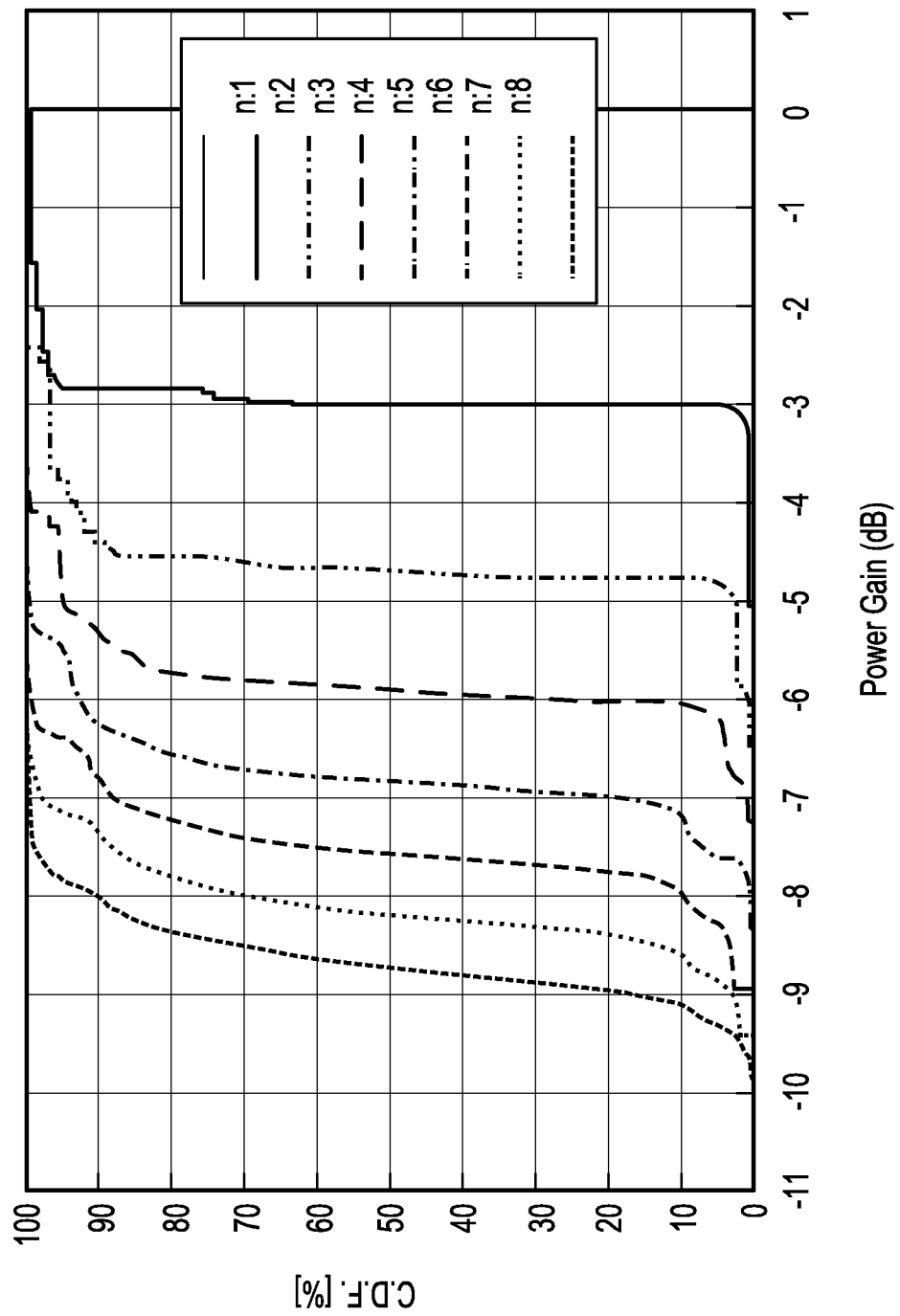
FIG. 6 illustrates the distribution of the sum of squared amplitudes of the weights for different number of multibeams. In this case we assume an equal power weight (1/n) of the terms.

In other words, in some examples, wherein the combined weight vector, w, is determined such that each element of the combined weight vector has unit length. This optimization problem may be solved using well-known numerical methods, or by a simple re-mapping of each element of w to the unit circle. FIG. 6 illustrates the distribution of the sum of squared amplitudes of the weights for different number of multi-beams. In this case we assume an equal power weight (1/n) of the terms.

FIG. 6 illustrates an example of power utilization for a DFT based codebook showing the Cumulative Distribution Function (CDF) of $|w|_2^2=w^H w$. Here the precoding vector w is constructed by using Equation (2) using $\{b_1 \ldots b_n\}$ with $q_k=1/n$, for different values of n and the antenna array has dimensions 4×24.

In this example, for one wireless device (n=1), the power efficiency (gain) is 1 (here the coefficients have been normalized to be on the unit circle). The power loss is generally larger (gain is smaller) for a high number of wireless devices (large n).

Figure 7:
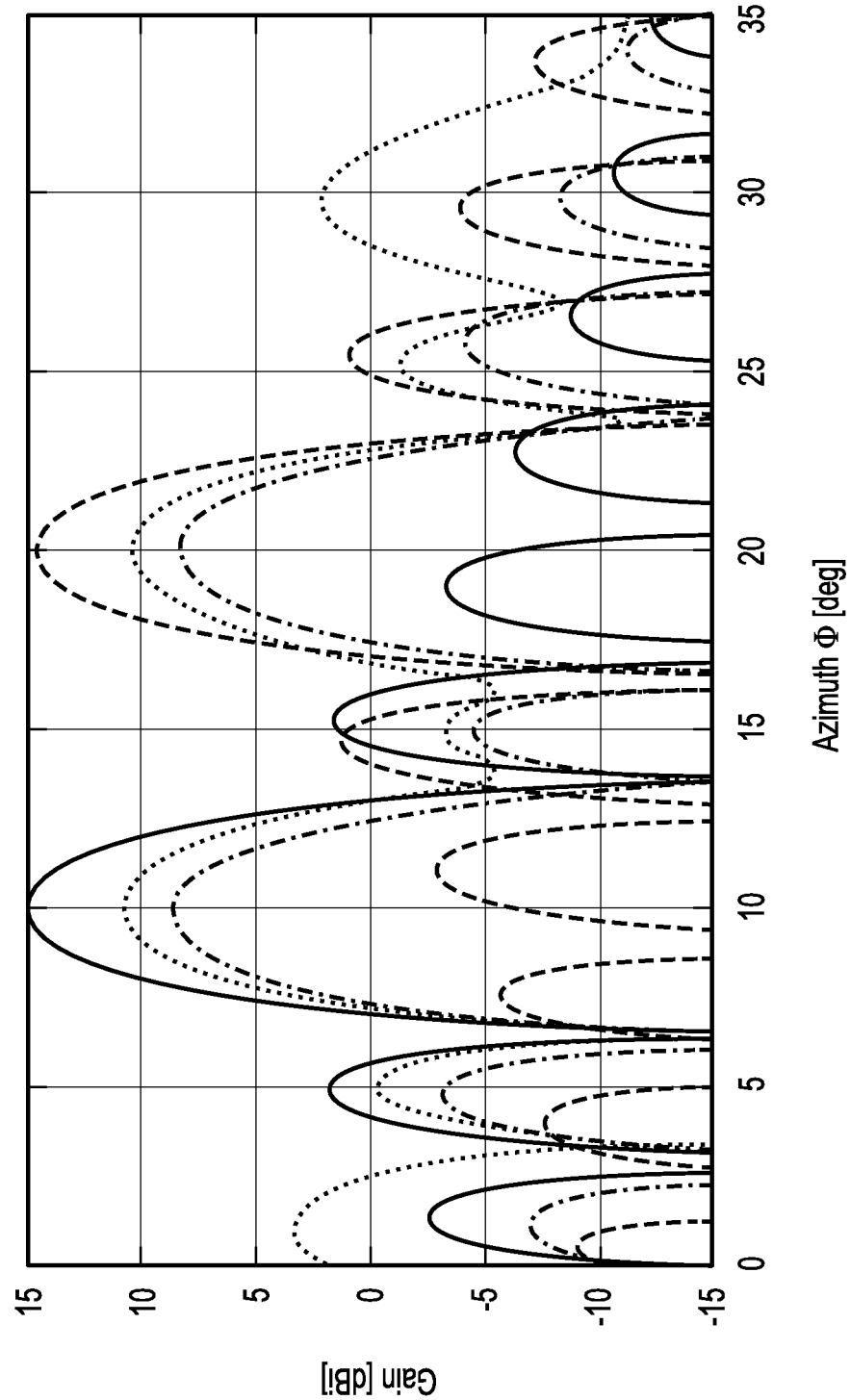
FIG. 7 illustrates antenna gain for an example with two wireless devices located at $\phi=10°$ and $\phi=20°$.

Using a simple rescaling of each element, $|w_m|=1$, (e.g. forcing the weights of the vector w onto the unit circle) may introduce a less optimal beam pattern (as illustrated in FIG. 7) but may maintain full power efficiency. The impact of the rescaling can be seen in FIG. 7 where the optimal transmit weight is compared to the scenario in which each element is forced to unit amplitude. In this example, it may be seen that the rescaling of the weights has a very minor impact on the pointing directions of the resulting combined beam, but renders better gain due to better power efficiency (here the power efficiency is included in the antenna gain).

FIG. 7 illustrates antenna gain for an example with two wireless devices located at $\phi=10°$ and $\phi=20°$. Solid line and dashed line illustrate the preferred beams (for example codebook beams) for wireless device 1 and 2, respectively. The dash-dotted line shows the combined beam according to Equation (2) with $q_k=\frac{1}{2}$, and dotted line corresponds to the weight vector from Equation (2) where each element of the vector w has been forced onto the unit circle, i.e. scaled such that all elements $w_m$ of w satisfies $|w_m|=1$.

The power loss may be larger for some combinations of beams. Which combinations of beams result in large power losses may depend on, for example, the antenna array configuration and how closely wireless devices are located. Combinations that it may be desirable to avoid due to large power losses may be precomputed and avoided in scheduling decisions.

It will be appreciated that the power efficiency issue does not exist for the uplink.

Scheduling several wireless devices by the combined beam vector approach of Equation (2) may affect the link adaptation in the scheduler. For example, combining the two or more beam vectors preferred by each of the scheduled wireless devices may create a combined beam vector with less gain (and possibly less output power) in the directions of the wireless devices compared to using the preferred beam vectors themselves. This means that the reported link qualities associated with the reported beams are typically too optimistic, and may therefore be adjusted or compensated. The adjustment may be given by the expected quality loss from using the combined beam vector compared to the preferred beam for each wireless device. These losses may be estimated, either on the fly, or tabulated. Note that this link quality adjustment may affect other parts of the scheduler, e.g. the Physical Resource Block (PRB) allocation.

In some embodiments, the functionality of the base station may be divided between different nodes. For example, the base station may comprise a baseband unit and a radio node. In these examples, the step of obtaining a combined beam vector, w, based on a weighted sum of two or more beam vectors, $b_k$, associated with the two or more beams may comprise transmitting information over an interface between the nodes of the base station.

Figure 8:
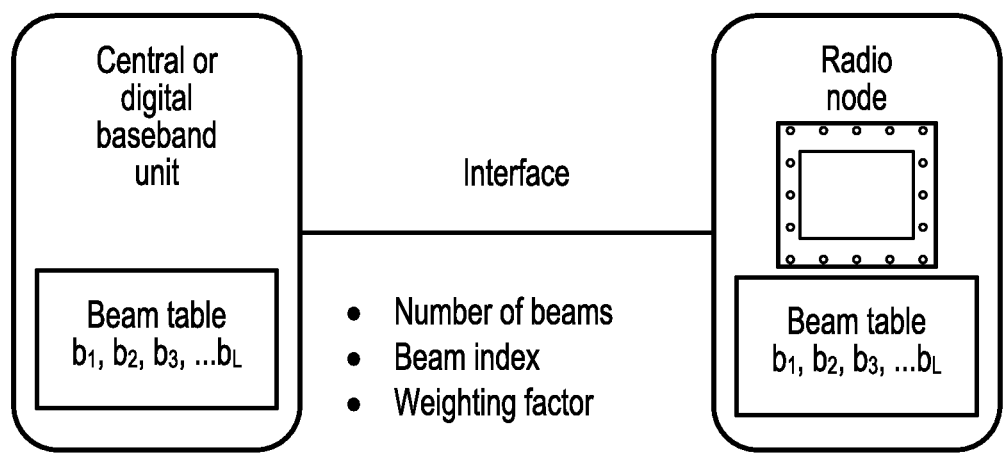
FIG. 8 illustrates an example in which the base station comprises a baseband unit and a radio node.

FIG. 8 illustrates an example in which the base station comprises a baseband unit and a radio node.

For example, the estimation of which beams, from the codebook of all available beams, that are part of a linear combination, and the individual weighting factor of each beam, may be performed in a baseband or central node, while the application of the final weight may be performed in a radio node.

In this example, instead of sending the combined beam vector $w=\Sigma_1^K q_k b_k$ over the interface from the baseband unit to the radio node, the (beam) index for $b_k$ plus the corresponding weights $q_k$ for each of the K components is sent over the interface. The receiving end, e.g. the radio node, may then have access to a table with all available beams, $b_k$, and may fetch the beamweights from the table to calculate the combined beam vector w. By not transmitting the actual combined beam vector w over the interface, a much more efficient signaling scheme is obtained compared to sending the combined beam vector w directly over the interface.

If, for example, each component of the (m×1) combined beam vector w is quantized to N bits, then m*N bits are needed for an m-element array to transmit the combined beam vector w. On the other hand, if there are L available beam vectors, $b_k$, and each weighting factor $q_k$ is quantized to P bits, only $K*P*\log_2$ (L) bits are needed to transmit the beam indexes and the weighting factors. So, as an example, for a m=256 element array, where the beam weights are quantized with 16 bits, 256*16=4096 bits are needed to send the resulting combined beam vector, w, over the interface. In contrast, for a codebook consisting of L=512 possible beam vectors, $b_k$, and the combined beam vector w is the sum of (less than) K=6 components, the $\log_2$ (512)=9 bits may be needed to pick the beam vectors $b_k$. Assuming that the each weight $q_k$ is represented by P=8 bits, then in total at most 6*9*8=432 bits are needed, which is a considerable saving compared to sending the combined beam vector w over the interface.

Figure 9:
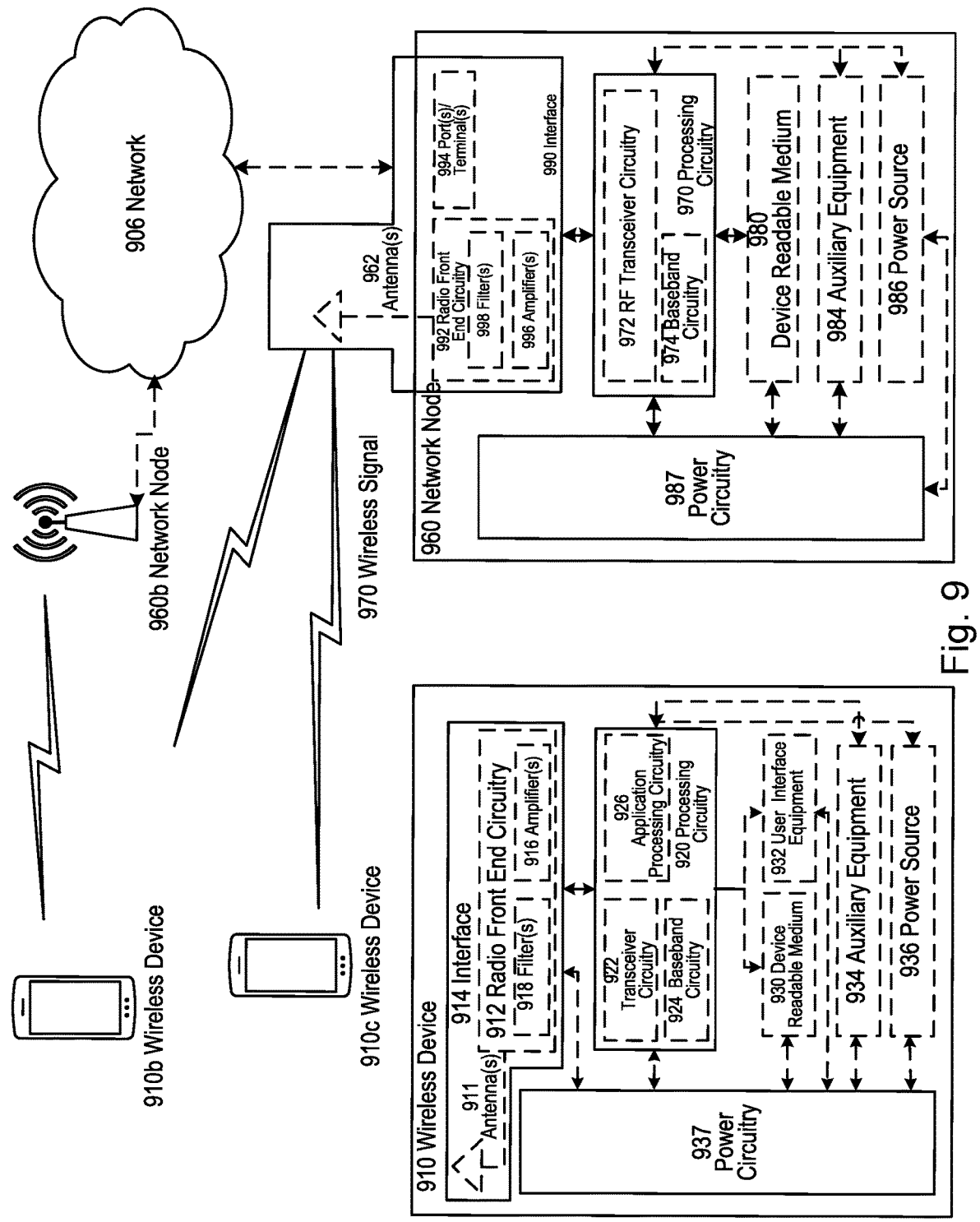
FIG. 9 illustrates a wireless network in accordance with some embodiments.

FIG. 9 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960b, and WDs 910, 910b, and 910c. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards. Network nodes 960 and 960b may be configured to perform the method as described with reference to FIG. 3 above.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 990 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port. The antenna 962 may be configured to perform beamforming.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Figure 10:
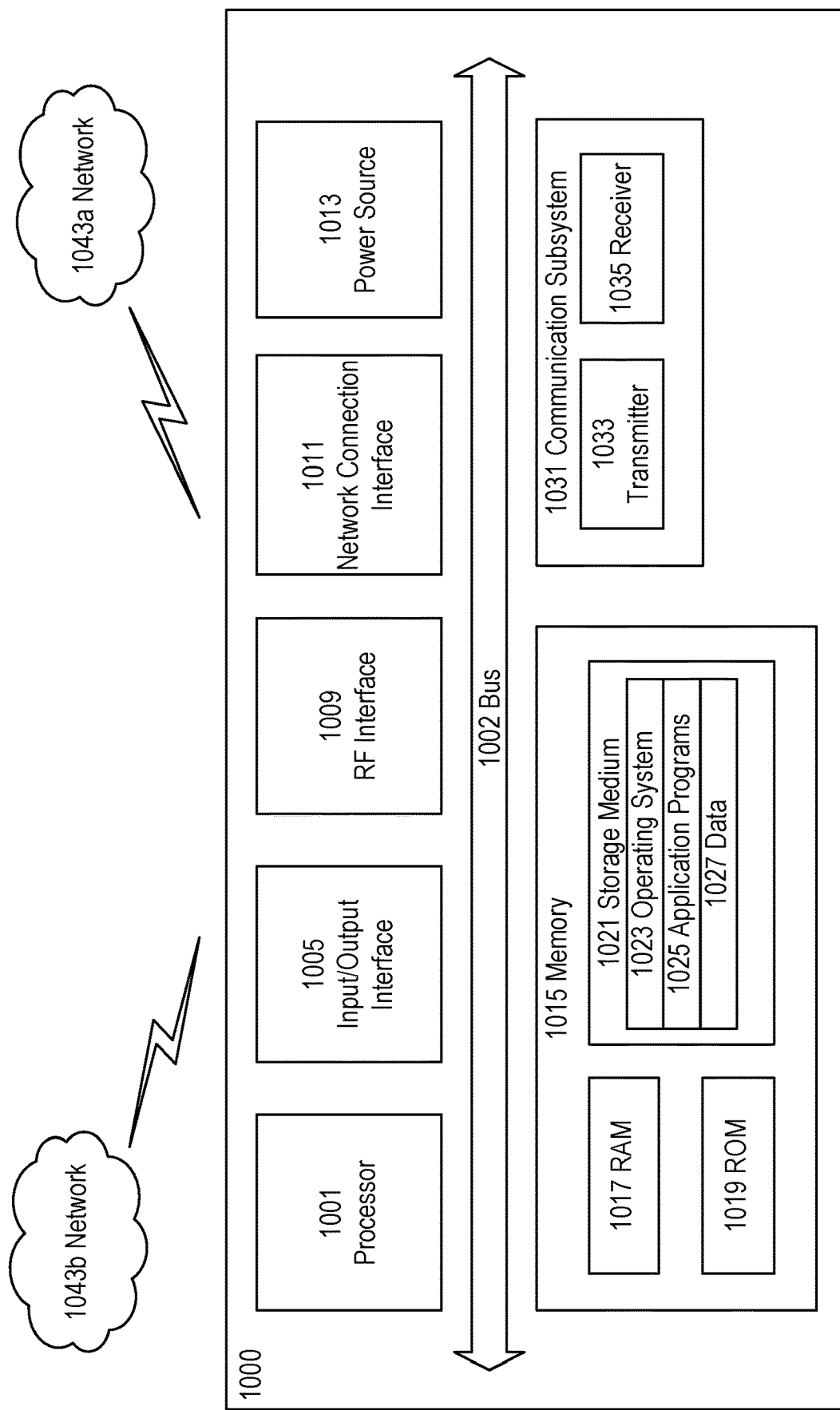
FIG. 10 illustrates a User Equipment in accordance with some embodiments.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied FIG. 10 illustrates a User Equipment in accordance with some embodiments FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1000 may be any UE identified by the $3^{rd}$ Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043b. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043b may encompass wired and/or wireless networks such as a local-area network (LAN), a wide-area network (WAN), a computer network, a wireless network, a telecommunications network, another like network or any combination thereof. For example, network 1043b may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
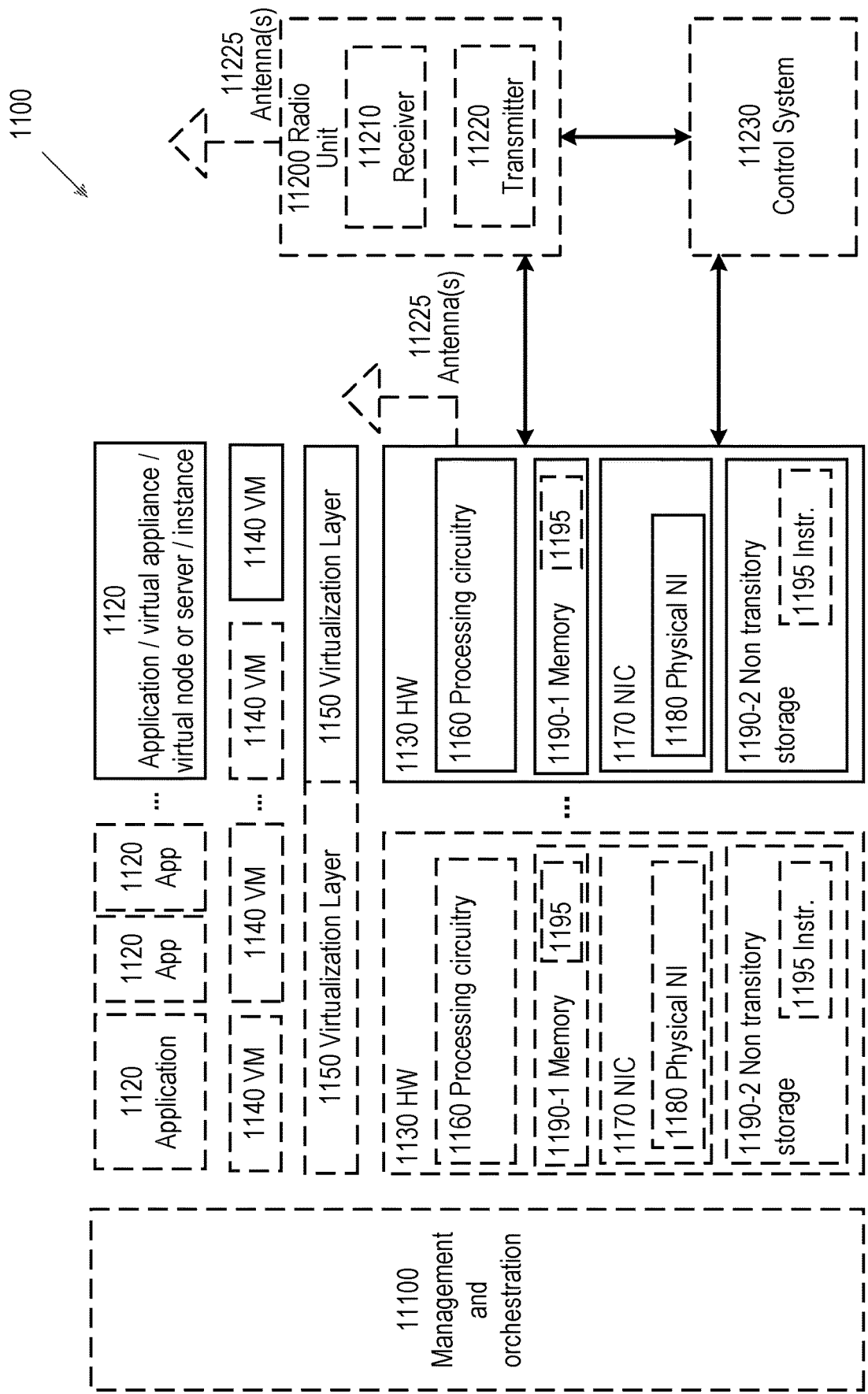
FIG. 11 illustrates a virtualization environment in accordance with some embodiments.

FIG. 11 illustrates a virtualization environment in accordance with some embodiments FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Figure 12:
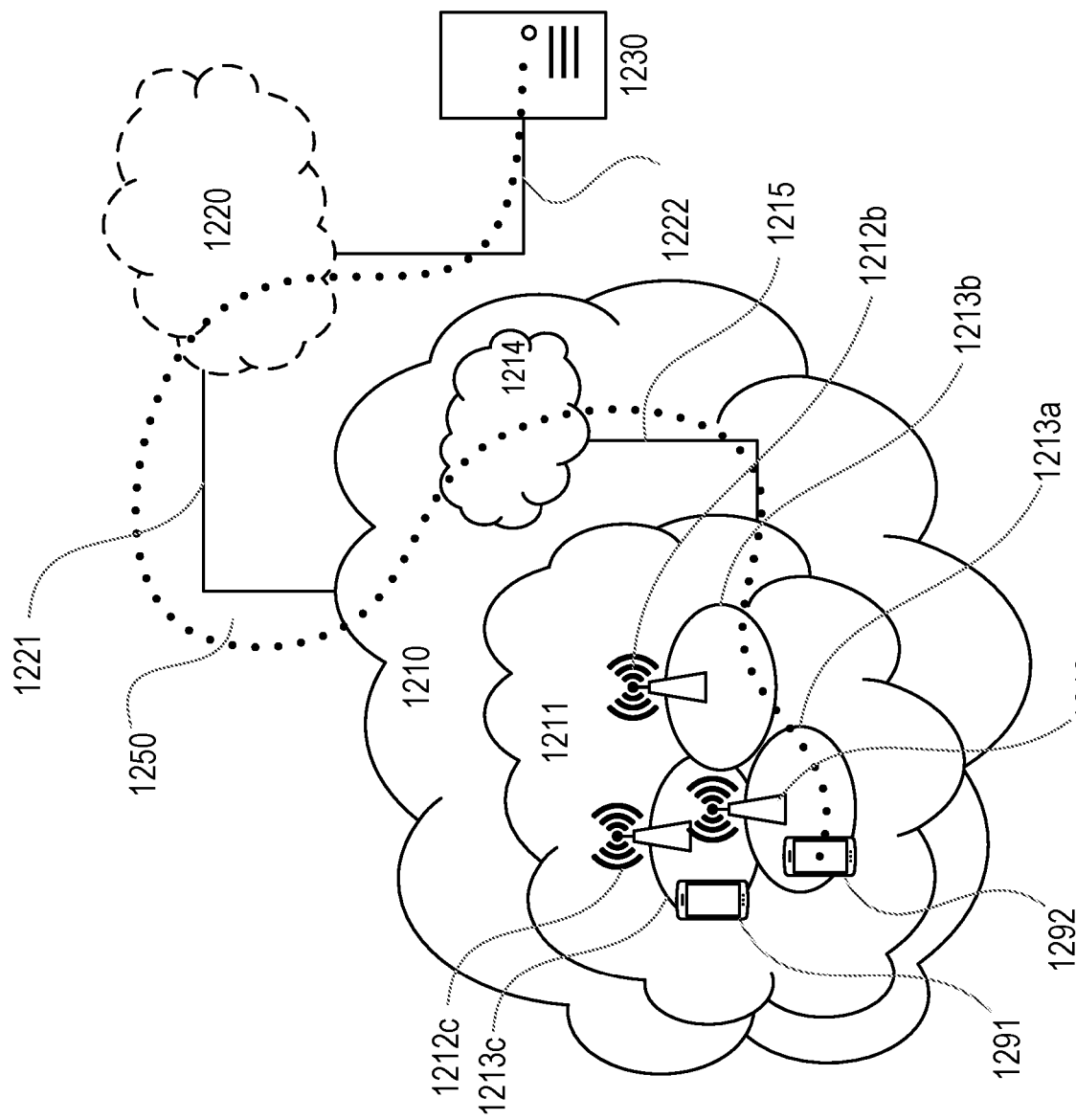
FIG. 12 illustrates a telecommunication network connected via an intermediate network to a host computer in accordance with some embodiments.

FIG. 12 illustrates a telecommunication network connected via an intermediate network to a host computer in accordance with some embodiments.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to core network 1214 over a wired or wireless connection 1215. A first UE 1291 located in coverage area 1213*c* is configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 13:
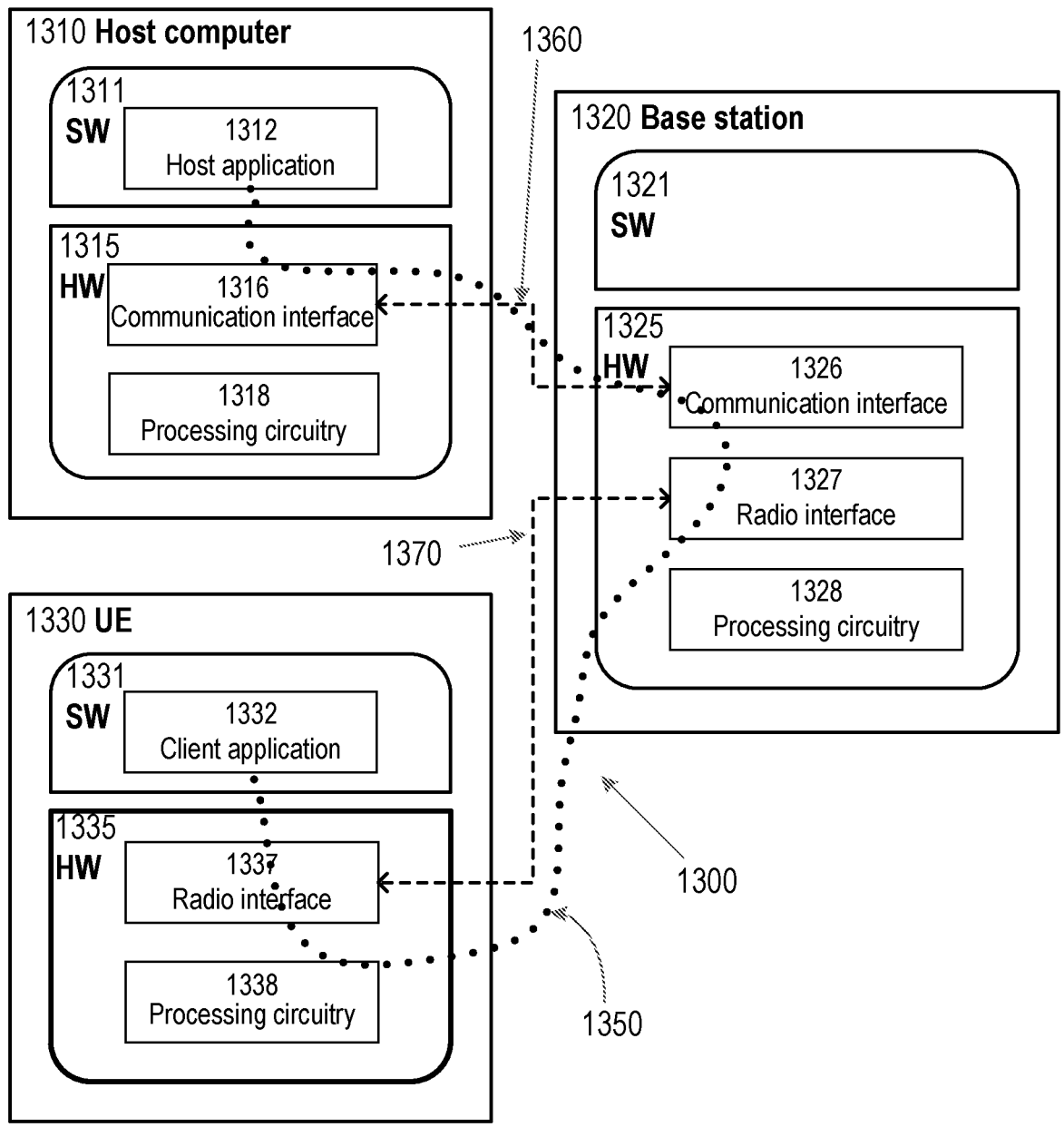
FIG. 13 illustrates a host computer communicating via a base station with a user equipment over a partially wireless connection in accordance with some embodiments.

FIG. 13 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the power consumption.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
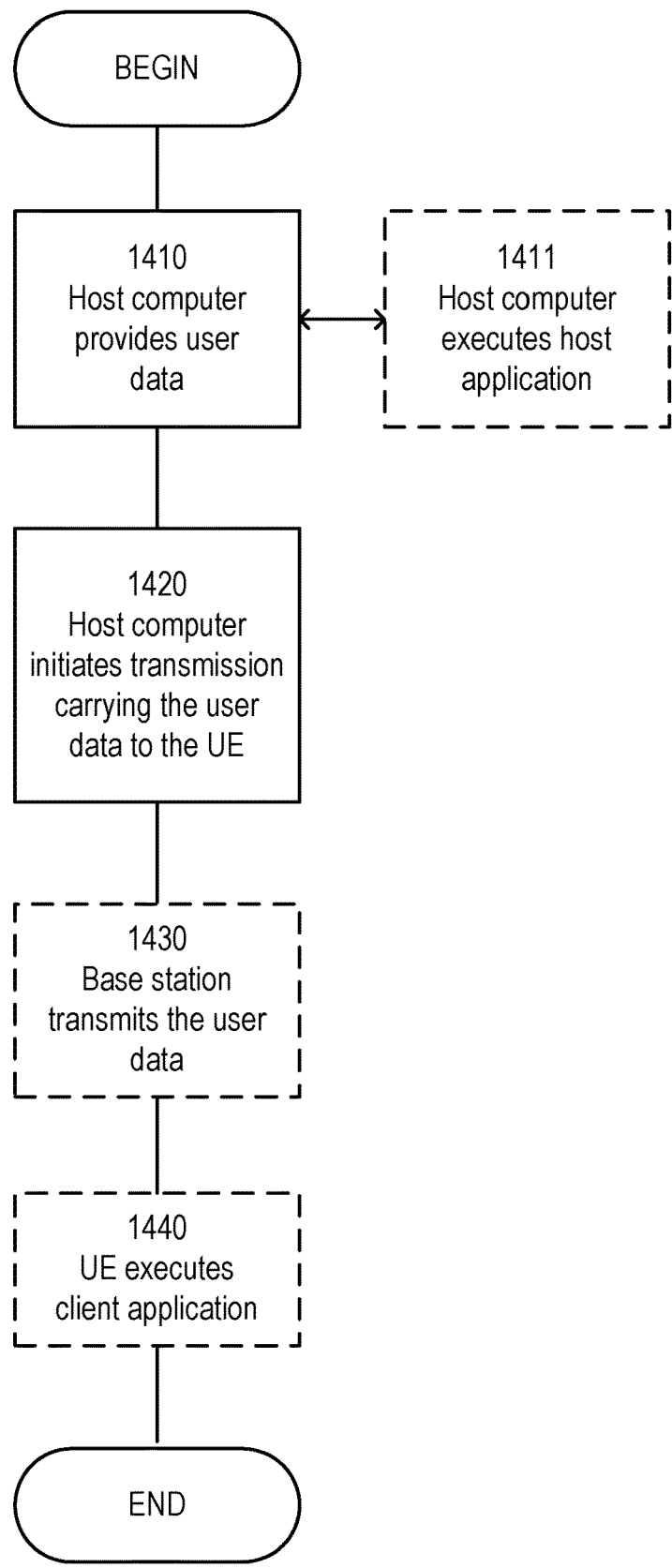
FIG. 14 illustrates methods implemented in a communication system including a host computer, a base station and a user equipment in accordance with some embodiments.

FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
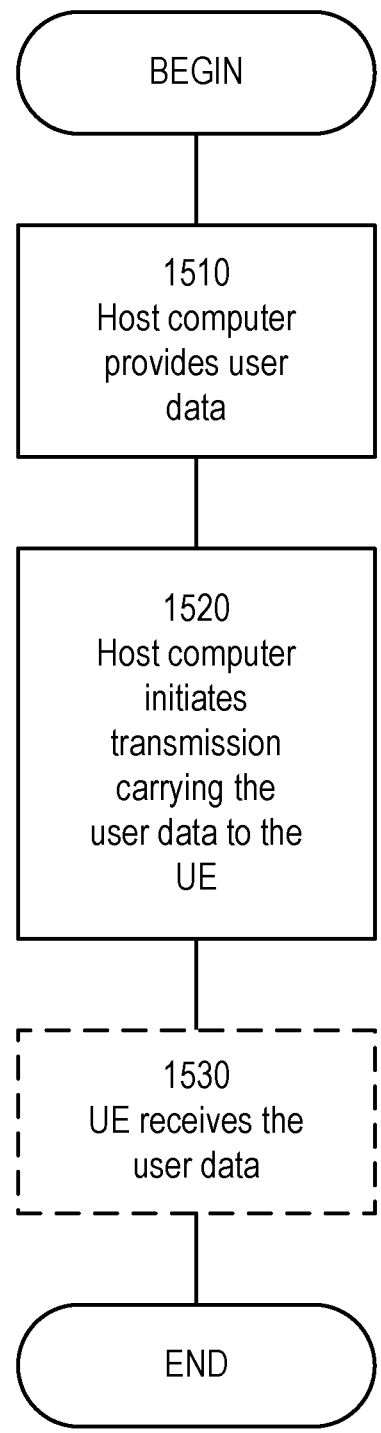
FIG. 15 illustrates methods implemented in a communication system including a host computer, a base station and a user equipment in accordance with some embodiments.

FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission FIG. 16 illustrates methods implemented in a communication system including a host computer, a base station and a user equipment in accordance with some embodiments.

Figure 16:
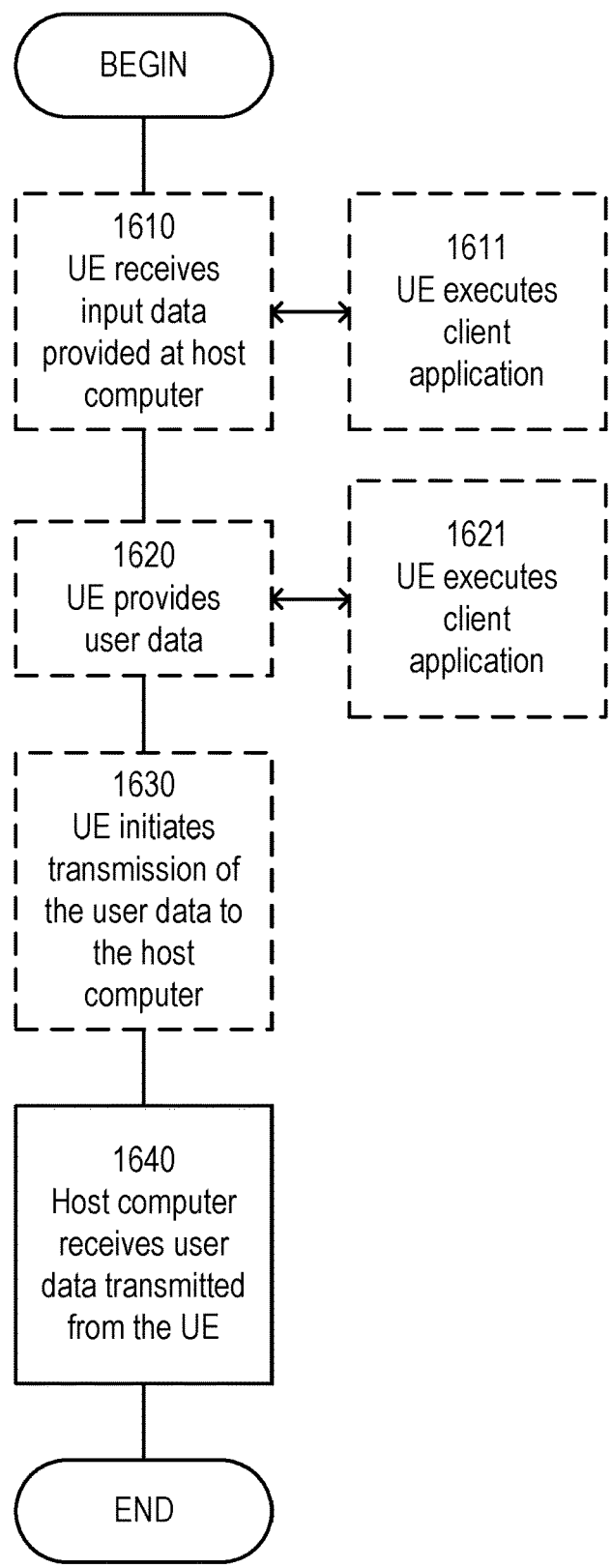
FIG. 16 illustrates methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
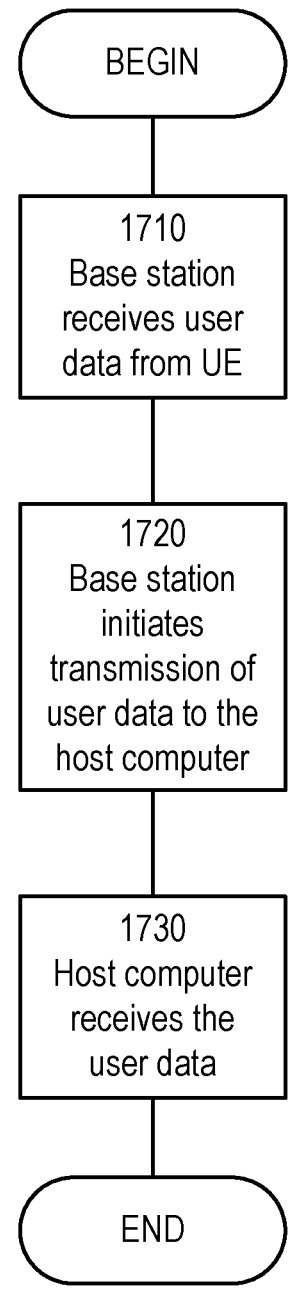
FIG. 17 illustrates methods implemented in a communication system including a host computer, a base station and a user equipment in accordance with some embodiments.

FIG. 17 illustrates methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 18:
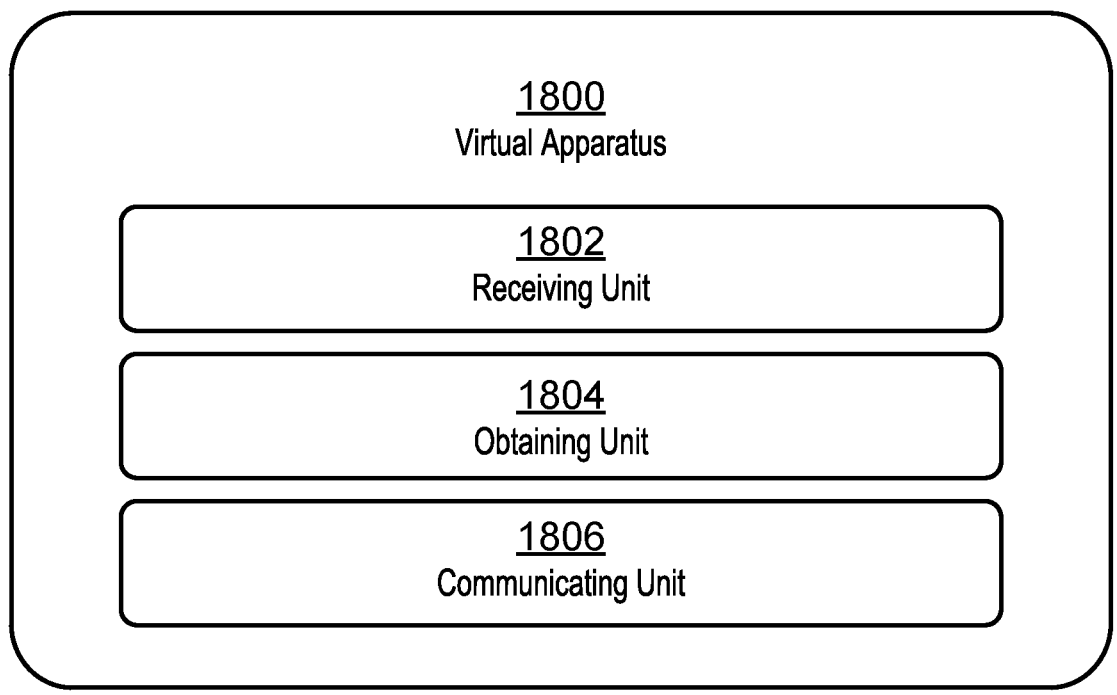
FIG. 18 illustrates a virtualization apparatus in accordance with some embodiments.

FIG. 18 illustrates a virtualization apparatus in accordance with some embodiments FIG. 18 illustrates a schematic block diagram of an apparatus 1800 in a wireless network (for example, the wireless network shown in FIG. 9). The apparatus may be implemented in a network node (e.g., network node 960 shown in FIG. 9). Apparatus 1800 is operable to carry out the example method described with reference to FIG. 3 and possibly any other processes or methods disclosed herein. It is also to be understood that the method of FIG. 3 is not necessarily carried out solely by apparatus 1800. At least some operations of the method can be performed by one or more other entities.

Virtual Apparatus 1800 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1802, obtaining unit 1804, and communicating unit 1806, and any other suitable units of apparatus 1800 to perform corresponding functions according one or more embodiments of the present disclosure.

As illustrated in FIG. 18, apparatus 1800 includes receiving unit 1802 configured to receive an indication of two or more beams, wherein the two or more beams meet a quality criterion associated with the at least one wireless device. Apparatus 1800 further comprises obtaining unit 1804 configured to obtain a combined beam vector, w, based on a weighted sum of two or more beam vectors, $b_k$, associated with the two or more beams. Apparatus 1800 further comprises communicating unit 1806 configured to communicate with the at least one wireless device using the first beam, wherein the first beam is generated using the combined beam vector.

Figure 19:
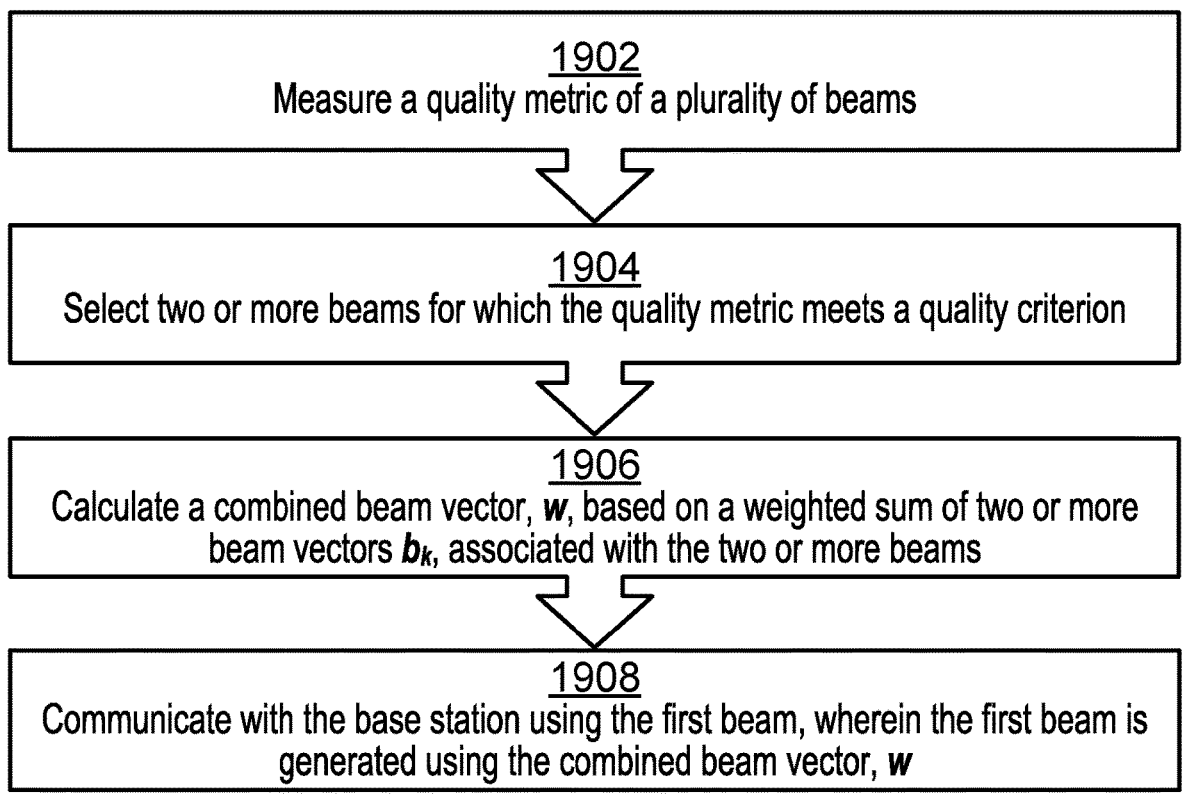
FIG. 19 illustrates a method in accordance with some embodiments.

FIG. 19 illustrates a method in accordance with some embodiments

FIG. 19 illustrates a method in a wireless device for communicating with a base station using a first beam. In step 1902 the method comprises measuring a quality metric of a plurality of beams. In step 1904 the method comprises selecting two or more beams for which the quality metric meets a quality criterion. In step 1906 the method comprises calculating a combined beam vector, w, based on a weighted sum of two or more beam vectors, $b_k$, associated with the two or more beams; and IN step 1908 the method comprises communicating with the base station using the first beam, wherein the first beam is generated using the combined beam vector, w.

Figure 20:
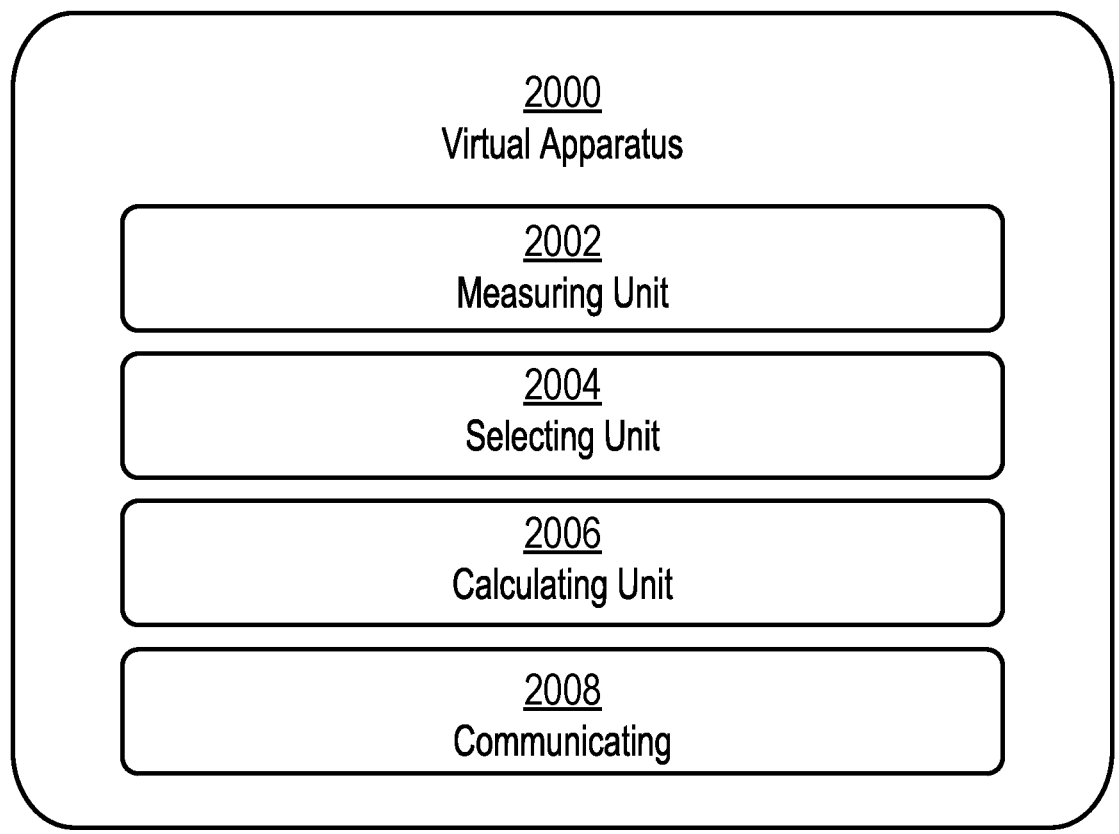
FIG. 20 illustrates a virtualization apparatus in accordance with some embodiments.

FIG. 20 illustrates a virtualization apparatus in accordance with some embodiments FIG. 20 illustrates a schematic block diagram of an apparatus 2000 in a wireless network (for example, the wireless network shown in FIG. 9). The apparatus may be implemented in a wireless device (e.g., network node 910 shown in FIG. 9). Apparatus 2000 is operable to carry out the example method described with reference to FIG. 19 and possibly any other processes or methods disclosed herein. It is also to be understood that the method of FIG. 19 is not necessarily carried out solely by apparatus 2000. At least some operations of the method can be performed by one or more other entities.

Virtual Apparatus 2000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause measuring unit 2002, selecting unit 2004, and calculating unit 2006 and communicating unit 2008, and any other suitable units of apparatus 2000 to perform corresponding functions according one or more embodiments of the present disclosure.

As illustrated in FIG. 20, apparatus 2000 includes measuring unit 2002 configured to measure a quality metric of a plurality of beams. Apparatus 2000 further comprises selecting unity 2004 configured to select two or more beams for which the quality metric meets a quality criterion. Apparatus 2000 further comprises calculating unit 2006 configured to calculate a combined beam vector, w, based on a weighted sum of two or more beam vectors, $b_k$, associated with the two or more beams. Apparatus 2000 further comprises communicating unit 2008 configured to communicate with the base station using the first beam, wherein the first beam is generated using the combined beam vector, w.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments

Group A Embodiments

1. A method in a wireless device for communicating with a base station using a first beam, the method comprising:
   measuring a quality metric of a plurality of beams;
   selecting two or more beams for which the quality metric meets a quality criterion;
   calculating a combined beam vector, w, based on a weighted sum of two or more beam vectors, $b_k$, associated with the two or more beams; and
   communicating with the base station using the first beam, wherein the first beam is generated using the combined beam vector, w.

Group B Embodiments

2. A method performed by a base station for communicating with at least one wireless device using a first beam, the method comprising:

receiving an indication of two or more beams, wherein the two or more beams meet a quality criterion associated with the at least one wireless device;

obtaining a combined beam vector, w, based on a weighted sum of two or more beam vectors, $b_k$, associated with the two or more beams; and communicating with the at least one wireless device using the first beam, wherein the first beam is generated using the combined beam vector.

3. The method of embodiment 2 wherein the at least one wireless device comprises at least two wireless devices, and the quality criterion comprises a criterion that each beam of the two or more beams comprises a highest quality beam measured by each of the at least two wireless devices.

4. The method of embodiment 2 wherein the quality criterion comprises a criterion that the two or more beams comprise the N highest quality beams measured by a first wireless device.

5. The method of claim 2 wherein the quality criterion comprises a criterion that a quality of the two or more beams measured by one of the at least one wireless device is higher than a quality threshold.

6. The method of any previous embodiment wherein the indication comprises a plurality of link quality metrics associated with the two or more beams.

7. The method of any one of embodiments 2 to 6 wherein the two or more beams comprise beams generated based on predetermined beam vectors.

8. The method of any one of embodiments 6 to 7 when dependent on claim 5 wherein the step of receiving comprises receiving the plurality of link quality metrics, $p_k$, and receiving a plurality of indexes k, associated with each of the plurality of link quality metrics, $p_k$, wherein each index k is associated with the one of the two or more beams.

9. The method of any preceding embodiment wherein the step of obtaining comprises:
determining the combined beam vector, w, based on a linear sum, $\Sigma q_k b_k$, of the two or more beam vectors, $b_k$, weighted by a plurality of weights, $q_k$.

10. The method of embodiment 9 further comprising:
a. receiving a plurality of indexes, k, each corresponding to a respective one of the two or more beam vectors; and
b. receiving the plurality of weights, $q_k$, each associated with a respective one of the indexes, k.

11. The method of embodiment 9 or 10 wherein each of the plurality of weights, $q_k$, is determined based on a priority associated with information communicated using a beam generated using the associated beam vector, $b_k$.

12. The method of embodiment 9 to 11 wherein each of the plurality of weights, $q_k$, is determined based on a minimum quality of service associated with information communicated using a beam generated using the associated beam vector, $b_k$.

13. The method of embodiment 9 to 12 when dependent on claim 5 wherein each of the plurality of weights, $q_k$ is determined based on the respective link quality metric, $p_k$, associated with the one of the two or more beams to which the weight is to be applied.

14. The method of any one of embodiments 9 to 13 wherein the combined weight vector, w, is determined such that each element of the combined weight vector has unit length.

15. The method of any previous embodiment wherein the at least one wireless device comprises at least two wireless devices and the step of communicating with the at least one wireless device using the first beam comprises:
frequency multiplexing information to be transmitted to the at least two wireless devices and transmitting the frequency multiplexed information using the first beam.

16. The method of any of the previous embodiments, further comprising:
obtaining user data; and
forwarding the user data to a host computer or a wireless device.

Group C Embodiments

17. A wireless device for communicating with a base station using a first beam, the wireless device comprising:
processing circuitry configured to perform any of the steps of any of the Group A embodiments; and
power supply circuitry configured to supply power to the wireless device.

18. A base station for communicating with at least one wireless device using a first beam, the base station comprising:
processing circuitry configured to perform any of the steps of any of the Group B embodiments;
power supply circuitry configured to supply power to the base station.

19. A user equipment (UE) for communicating with a base station using a first beam, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

20. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

21. The communication system of the previous embodiment further including the base station.

22. The communication system of the previous 2 embodiments, further including the UE, wherein the UE is configured to communicate with the base station.

23. The communication system of the previous 3 embodiments, wherein:
the processing circuitry of the host computer is configured to execute a host application, thereby providing the user data; and
the UE comprises processing circuitry configured to execute a client application associated with the host application.
24. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.
25. The method of the previous embodiment, further comprising, at the base station, transmitting the user data.
26. The method of the previous 2 embodiments, wherein the user data is provided at the host computer by executing a host application, the method further comprising, at the UE, executing a client application associated with the host application.
27. A user equipment (UE) configured to communicate with a base station, the UE comprising a radio interface and processing circuitry configured to performs the of the previous 3 embodiments.
28. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.
29. The communication system of the previous embodiment, wherein the cellular network further includes a base station configured to communicate with the UE.
30. The communication system of the previous 2 embodiments, wherein:
the processing circuitry of the host computer is configured to execute a host application, thereby providing the user data; and
the UE's processing circuitry is configured to execute a client application associated with the host application.
31. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.
32. The method of the previous embodiment, further comprising at the UE, receiving the user data from the base station.
33. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.
34. The communication system of the previous embodiment, further including the UE.
35. The communication system of the previous 2 embodiments, further including the base station, wherein the base station comprises a radio interface configured to communicate with the UE and a communication interface configured to forward to the host computer the user data carried by a transmission from the UE to the base station.
36. The communication system of the previous 3 embodiments, wherein:
the processing circuitry of the host computer is configured to execute a host application; and
the UE's processing circuitry is configured to execute a client application associated with the host application, thereby providing the user data.
37. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.
38. A method implemented in a communication system including a host computer, a base station and a user equipment (UE), the method comprising:
at the host computer, receiving user data transmitted to the base station from the UE, wherein the UE performs any of the steps of any of the Group A embodiments.
39. The method of the previous embodiment, further comprising, at the UE, providing the user data to the base station.
40. The method of the previous 2 embodiments, further comprising:
at the UE, executing a client application, thereby providing the user data to be transmitted; and
at the host computer, executing a host application associated with the client application.
41. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.
42. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
43. The communication system of the previous embodiment further including the base station.

44. The communication system of the previous 2 embodiments, further including the UE, wherein the UE is configured to communicate with the base station.
45. The communication system of the previous 3 embodiments, wherein:
    the processing circuitry of the host computer is configured to execute a host application;
    the UE is configured to execute a client application associated with the host application, thereby providing the user data to be received by the host computer.
46. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.
47. The method of the previous embodiment, further comprising at the base station, receiving the user data from the UE.

The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

ABF—Analog BeamForming
BF—BeamForming
CDF—Cumulative Distribution Function
CQI—Channel Quality Indicator
CSI—Channel State Information
CSI-RS—Channel State Information—Reference Signal
DFT—Discrete Fourier Transform
FD—Frequency Domain
IF—Intermediate Frequency
LTE—Long Term Evolution (4G)
NR—New Radio (5G)
OFDM—Orthogonal Frequency-Division Multiplexing
PA—Power Amplifier
PRB—Physical Resource Block
QoS—Quality of Service
RF—Radio Frequency
RSRP—Reference Signals Received Power
SSB—Synchronization Signal Block
TD—Time Domain
UE—User Equipment
ULA—Uniform Linear Array
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a base station for communicating with at least one wireless device using a first beam, the method comprising:
   receiving an indication of two or more beams, wherein the two or more beams meet a quality criterion associated with the at least one wireless device;
   obtaining a combined beam vector, w, based on a weighted sum of two or more beam vectors, $b_k$, associated with the two or more beams; and
   communicating with the at least one wireless device using the first beam, wherein the first beam is generated using the combined beam vector, wherein the at least one wireless device comprises at least two wireless devices, and the quality criterion comprises a criterion that each beam of the two or more beams comprises a highest quality beam measured by each of the at least two wireless devices.

2. The method of claim 1 wherein the quality criterion comprises a criterion that the two or more beams comprise N highest quality beams measured by a first wireless device.

3. The method of claim 1 wherein the quality criterion comprises a criterion that a quality of the two or more beams measured by one of the at least one wireless device is higher than a quality threshold.

4. The method of claim 1 wherein the indication comprises a plurality of link quality metrics associated with the two or more beams.

5. The method of claim 1 wherein the two or more beams comprise beams generated based on predetermined beam vectors.

6. The method of claim 1 wherein the step of obtaining comprises:
   determining the combined beam vector, w, based on a linear sum, $\Sigma q_k b_k$, of the two or more beam vectors, $b_k$, weighted by a plurality of weights, $q_k$.

7. The method of claim 6 further comprising:
   receiving a plurality of indexes, k, each corresponding to a respective one of the two or more beam vectors; and
   receiving the plurality of weights, $q_k$, each associated with a respective one of the indexes, k.

8. The method of claim 6 wherein each of the plurality of weights, $q_k$, is determined based on a priority associated with information communicated using a beam generated using the associated beam vector, $b_k$.

9. The method of claim 6 wherein each of the plurality of weights, $q_k$, is determined based on a minimum quality of service associated with information communicated using a beam generated using the associated beam vector, $b_k$.

10. The method of claim 6 wherein each of the plurality of weights, $q_k$ is determined based on the respective link quality metric, $p_k$, associated with the one of the two or more beams to which the weight is to be applied.

11. The method of claim 6 wherein the combined weight vector, w, is determined such that each element of the combined weight vector has unit length.

12. The method of claim 1 wherein the at least one wireless device comprises at least two wireless devices and the step of communicating with the at least one wireless device using the first beam comprises:
   frequency multiplexing information to be transmitted to the at least two wireless devices and transmitting the frequency multiplexed information using the first beam.

13. The method of claim 1, further comprising:
   obtaining user data; and
   forwarding the user data to a host computer or a wireless device.

14. The method of claim 1 wherein the received indication of the two or more beam is directly obtained from uplink measurements by observing channel directions.

15. A method in a wireless device for communicating with a base station using a first beam, the method comprising:
   measuring a quality metric of a plurality of beams;
   selecting two or more beams for which the quality metric meets a quality criterion;
   calculating a combined beam vector, w, based on a weighted sum of two or more beam vectors, $b_k$, associated with the two or more beams; and
   communicating with the base station using the first beam, wherein the first beam is generated using the combined beam vector, w, wherein the at least one wireless device comprises at least two wireless devices, and the quality criterion comprises a criterion that each beam of the two or more beams comprises a highest quality beam measured by each of the at least two wireless devices.

16. A base station for communicating with at least one wireless device using a first beam, the base station comprising processing circuitry configured to:
   receive an indication of two or more beams, wherein the two or more beams meet a quality criterion associated with the at least one wireless device;
   obtain a combined beam vector, w, based on a weighted sum of two or more beam vectors, $b_k$, associated with the two or more beams; and
   communicate with the at least one wireless device using the first beam, wherein the first beam is generated using the combined beam vector, wherein the at least one wireless device comprises at least two wireless devices, and the quality criterion comprises a criterion that each beam of the two or more beams comprises a highest quality beam measured by each of the at least two wireless devices.

17. The base station of claim 16 wherein the quality criterion comprises a criterion that the two or more beams comprise N highest quality beams measured by a first wireless device.

18. A wireless device for communicating with a base station using a first beam, the wireless device comprising processing circuitry configured to:
   measure a quality metric of a plurality of beams;
   select two or more beams for which the quality metric meets a quality criterion;
   calculate a combined beam vector, w, based on a weighted sum of two or more beam vectors, $b_k$, associated with the two or more beams; and
   communicate with the base station using the first beam, wherein the first beam is generated using the combined beam vector, w, wherein the at least one wireless device comprises at least two wireless devices, and the quality criterion comprises a criterion that each beam of the two or more beams comprises a highest quality beam measured by each of the at least two wireless devices.

* * * * *